UNITED STATES PATENT OFFICE.

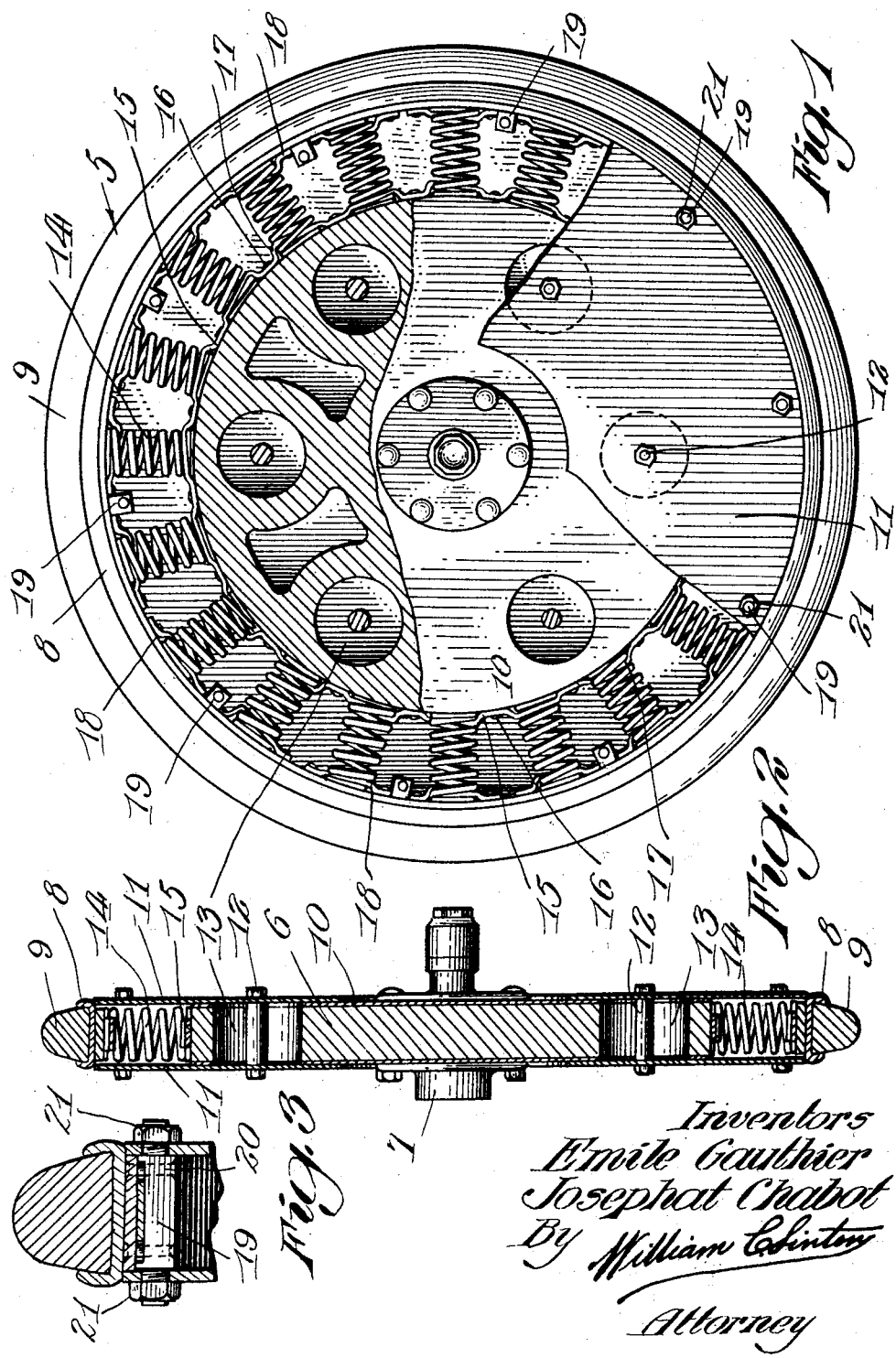

EMILE GAUTHIER AND JOSEPHAT CHABOT, OF VILLE ST. PIERRE, QUEBEC, CANADA.

RESILIENT WHEEL.

1,404,018.  Specification of Letters Patent.  Patented Jan. 17, 1922.

Application filed May 16, 1921. Serial No. 469,888.

*To all whom it may concern:*

Be it known that we, EMILE GAUTHIER and JOSEPHAT CHABOT, both subjects of the King of Great Britain, and residing at Ville St. Pierre, Province of Quebec, Canada, have invented certain new and useful Improvements in Resilient Wheels; and we do hereby declare that the following is a full, clear, and exact description of the invention, such as will enable others skilled in the art to which it appertains to make and use the same.

The present invention relates to new and useful improvements in resilient wheels.

The primary object of the invention is the provision of a resilient wheel so designed and constructed as to make possible the elimination of the customary pneumatic tire.

Another object of the invention is the provision of a resilient wheel including a main body portion and an outer rim resiliently connected thereto and movable relative to the said body portion to give the proper spring effect caused by the usual pneumatic tires.

Another object of the invention is the provision of a wheel including a central body portion which supports the hub and outer rim which supports the tire, together with means for movably mounting said sections so they will have a yielding movement, and also means for encasing the same to prevent the entrance of dirt or other foreign particles to the movable parts which would prevent their proper operation.

A still further object of the invention is the provision of a resilient wheel such as above referred to which will be comparatively simple and inexpensive to manufacture, reliable and efficient in use, and readily operated.

With the above and other objects in view, the present invention resides in the novel features of construction, formations, combinations and arrangements of parts to be hereinafter more fully described, claimed and illustrated in the accompanying drawing forming a part of the present application, and in which:

Figure 1 is a side elevation of a wheel constructed in accordance with the present invention, parts thereof being broken away and shown in section;

Figure 2 is a transverse sectional view thereof; and,

Figure 3 is an enlarged detail sectional view illustrating the outer rim.

Referring now to the accompanying drawing by corresponding characters of reference throughout the several views, the numeral 5 designates in general my improved wheel which comprises a central circular body portion 6, which carries centrally thereof the hub 7. The outer rim is shown at 8 and supports a solid rubber tire 9.

The outer sides of the body portion 6 are encased in plates 10 which are secured thereto in any desired manner, and which slidably engage the inner surfaces of the circular plates 11 which are carried by the said rim 8.

Bolts 12 pass through the plates 11 securing them together and extend through the enlarged openings 13 formed in the body portion 6 and plates 10 respectively which are secured thereto. This obviously provides for a movement between the rim 8 and body portion 6.

In order to maintain the rim 8 in its concentric relation to the hub 7, a plurality of springs 14 are interposed between the inner side of the rim and the outer side of the body portion, being held in position at their inner ends by a continuous strip 15 which is secured to the outer surface of the body portion by suitable fastening devices 16. This strip 15 between the fastening elements 16 is offset as shown at 17 to removably engage the inner ends of the springs and it will be seen from the drawings that these offset portions 17 are disposed at a slight angle to pass between the lower convolutions of the springs in order that they may be readily applied to or removed from the wheel if desired.

The outer ends of the springs are secured in similarly formed clips 18, while in order to insure the positive connection between the rim 8 and circular plates 11, these plates 11 are secured together by stay bolts 19 which are riveted as at 20 to the rim 8 and have reduced threaded ends which pass through openings in the plate to which they are held by the nuts 21.

From the foregoing description, taken in connection with the accompanying drawing, it will be manifest that a resilient wheel is provided which is preferably applicable for use upon motor vehicles, and which will fulfil all of the necessary requirements of such a device, and it should be understood in this connection, that various minor changes in the specific details of construction can be resorted to within the scope of the appended claims without departing from the spirit or sacrificing any of the advantages of the invention.

Having thus fully described our invention, what we claim as new and desire to protect by Letters Patent is:—

1. The herein described resilient wheel comprising a circular body portion, a rim disposed concentrically thereto, springs interposed between the body portion and rim for resiliently retaining the latter in concentric relation, a strip attached to the body portion for engaging the inner ends of the springs, said strip being spaced at intervals and inclined relative to the body portion, clips attached to the rim for engaging the outer ends of the springs, said clips being spaced and inclined relative to the body portion, and means for sealing and encasing the springs.

2. The herein described resilient wheel comprising a circular body portion, a hub section carried thereby, plates secured to the opposite sides of the body portion, a rim, springs interposed between the rim and the body portion, a strip attached to the body portion for engaging the inner ends of the springs, said strip being spaced at intervals and inclined relative to the body portion, clips attached to the rim for engaging the outer ends of the springs, said clips being spaced and inclined relative to the body portion, circular plates carried by the rim and slidably engaging the plates carried by the body portion, and bolts passing through enlarged openings formed in the body portion and plates secured thereto and secured at their ends to the plates carried by the rim, as and for the purposes set forth.

3. The herein described resilient wheel for automobiles comprising a circular body portion, plates secured thereto and engaging the opposite sides thereof, said body portion and plates having enlarged aligning openings formed therein, a rim spaced from said body portion, springs interposed between the body portion and rim, a strip attached to the body portion for engaging the inner ends of the springs, said strip being spaced at intervals and inclined relative to the body portion, clips attached to the rim for engaging the outer ends of the springs, said clips being spaced and inclined relative to the body portion, stay bolts riveted to said rim and disposed between the springs, circular plates secured to the rim by said stay bolts and slidably engaging the plates carried by the body portion for movement relative thereto, and bolts connecting said plates carried by the rim and disposed within the openings formed in the body portion and first mentioned plates, substantially as and for the purposes set forth.

In witness whereof we have hereunto set our hands.

EMILE GAUTHIER.
JOSEPHAT CHABOT.